United States Patent [19]

Lee

[11] Patent Number: 5,416,164
[45] Date of Patent: May 16, 1995

[54] SOLUTION OF PPD-T AND PVP AND ARTICLES MADE THEREFROM

[75] Inventor: Kiu-Seung Lee, Richmond, Va.

[73] Assignee: E. I. Du Pont de Nemours and Company, Wilmington, Del.

[21] Appl. No.: 58,963

[22] Filed: Apr. 12, 1993

[51] Int. Cl.⁶ .............................................. C08L 77/00
[52] U.S. Cl. ...................................... 525/182; 525/178
[58] Field of Search ......................................... 525/182

[56] References Cited

U.S. PATENT DOCUMENTS

| | | | |
|---|---|---|---|
| 3,036,988 | 5/1962 | Knospe | 525/182 |
| 4,051,300 | 9/1977 | Klein et al. | 428/398 |
| 5,073,440 | 12/1991 | Lee | 428/224 |
| 5,135,687 | 8/1992 | Lee | 264/28 |

FOREIGN PATENT DOCUMENTS 381172  9/1990  European Pat. Off. .
401740 12/1990  European Pat. Off. .

Primary Examiner—Ana L. Carrillo

[57] ABSTRACT

A poly(p-phenylene terephthalamide) composition is disclosed comprising 50 to 95 weight percent PPD-T and 5 to 50 weight percent PVP along with a process for making the composition and articles made from the composition.

4 Claims, No Drawings

SOLUTION OF PPD-T AND PVP AND ARTICLES MADE THEREFROM

BACKGROUND OF THE INVENTION

1. Field of the Invention

This invention relates to preparation and use of a poly(p-phenylene terephthalamide) (PPD-T) combination of materials which includes PPD-T and polyvinyl pyrrolidone (PVP); and to processes for making shaped articles made from that combination. Solutions in which the combination was formed during polymerization of the PPD-T can be used to make the shaped articles.

2. Description of the Prior Art

European Patent Publications No. 381,172, published Sep. 8, 1990 and No. 396,020, published Nov. 7, 1990, disclose what is termed a homogeneously mixed alloy of aromatic polyamides and PVP. It is said that the component parts of the alloys of these publications are completely miscible and exhibit a single glass transition temperature between those of the polyamide and the PVP. It is, also, stated that the PVP can be used in the alloy in concentrations of 2% to 98%, with 30% to 70% preferred; and that the PVP is not leached out of the alloy by water. The aromatic polyamides exemplified in those publications are substantially noncrystalline. PPD-T is not mentioned in those publications; and the publications contain no recognition of any differences between a system wherein aramids are polymerized in the presence of PVP and a system wherein completely polymerized aramids are merely dissolved in the presence of PVP.

European Patent Publication No. 401,740, published Dec. 12, 1990 discloses that completely polymerized PPD-T can be dissolved with completely polymerized PVP to make a fiber spinning dope to spin fibers which exhibit the tensile properties of the PPD-T and the moisture uptake and dyeability properties of the PVP.

SUMMARY OF THE INVENTION

The present invention provides a process for polymerizing PPD-T in a reaction medium which includes PVP to yield a solution of PPD-T and PVP and a process for preparing shaped articles from such solution including the steps of: establishing a solvent system including PVP, N-methyl pyrrolidone (NMP), and an alkaline earth metal salt; placing, in reactive contact in the solvent system, p-phenylene diamine (PPD) and terephthaloyl chloride (TCl) to yield a polymerization system; agitating the polymerization system to yield a PPD-T composition in solution; neutralizing acid generated during polymerization of the PPD and TCl by adding an alkaline-earth metal base to the polymerization system; and spinning, casting, molding, fibridating, or otherwise forming the PPD-T composition into shaped articles. The invention is, especially, focused on a process for spinning fibers using the polymerization system as the spinning dope.

The invention, also, provides shaped articles made in accordance with the above-mentioned process wherein the shaped article is a PPD-T composition which includes 50 to 95 weight percent PPD-T and 5 to 50 weight percent PVP. The shaped articles preferred in this invention are fibers, films, and fibrids.

DETAILED DESCRIPTION OF THE INVENTION

PPD-T is well-known for strength and modulus as well as for resistance to degradation at high temperatures. PPD-T is particularly well-known as the material of fibers which exhibit extremely high tensile properties. To make fibers and other shaped articles of PPD-T, however, has been very difficult due to the solvent systems which had to be used.

To make shaped articles of PPD-T, prior to this invention, the PPD-T had to be prepared and isolated from the polymerization system; and, then, the isolated PPD-T had to be dissolved in concentrated sulfuric acid and promptly used to make the articles. Solubility of PPD-T in the polymerization system was so low that meaningful polymer concentrations could not be obtained; and resolution in a stronger solvent was necessary. Concentrated sulfuric acid was used as the solvent for the PPD-T and great care had to be exercised to avoid excessive corrosion and unacceptable degradation of the polymer.

PPD-T is the primary polymer in practice of this invention. By PPD-T is meant the homopolymer resulting from mole-for-mole polymerization of p-phenylene diamine and terephthaloyl chloride and, also, copolymers resulting from incorporation of small amounts of other diacid chlorides with the terephthaloyl chloride and other diamines with the p-phenylene diamine. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or choro- or dichloroterephthaloyl chloride; provided, only, that the other aromatic diamines and aromatic diacid chlorides be present in amounts which permit preparation of anisotropic solutions.

Preparation of PPD-T has generally been performed by addition of the reactive polymerization components to a solvent system to make a polymerization system from which the PPD-T precipitates as the polymerization proceeds. The solvent and polymerization systems have generally included a salt which was believed to increase the solubility of the para-aramid. Even so, until the present invention, the solubility of the PPD-T in the polymerization system was not great enough to permit use of the polymerization system, itself, to make shaped articles of the PPD-T. Preparation of PPD-T is described in U.S. Pat. Nos. 3,869,429; 4,308,374; and 4,698,414.

In practice of this invention, PVP is added to the solvent system or the polymerization system; and, the presence of the PVP, for reasons not entirely understood, permits the PPD-T to remain in solution to a concentration far beyond the maximum concentration of PPD-T usually experienced in the past. By PVP is meant the polymer which results from linear polymerization of monomer units of N-vinyl-2-pyrrolidone and includes small amounts of comonomers which may be present in concentrations below those which do not interfere with the interaction of the PVP with the PPD-T.

It has been determined that PVP of nearly any molecular weight can be used in practice of this invention. PVP of molecular weights ranging from as little as about 5000 to as much as about 1,000,000 have been used and all have resulted in shaped articles exhibiting the benefits of the present invention. PVP of very high molecular weight yields spinning dopes of high viscosity. PVP with a molecular weight of about 10,000 to about 360,000 is preferred.

Although, as stated, not entirely understood, it is believed that, during polymerization of PPD-T in the presence of PVP, the PVP forms a complex with PPD-T; and the complex combination of PPD-T and PVP forms a mass of the polymers, combined but capable of acting separately. The PPD-T composition of this invention is a heterogeneous but intimate combination of PPD-T and PVP; and, due to the rigid rod nature of the PPD-T, may be unique in the character of the combination. It is believed that PVP, as a more or less solid form of the NMP solvent, is attracted by the PPD-T; but does not breach the PPD-T crystal structure. PVP appears to form a complex with PPD-T up to a saturation concentration of about 50 weight percent PVP based on the total weight of the composition. At concentrations below the saturation, PVP appears to be bound by a framework of the PPD-T crystal structure; and above the saturation concentration, there is free, unassociated PVP in the composition. At all concentrations of PVP, the PPD-T is present in the composition as an individual phase of crystalline material.

Studies have shown that the PPD-T unit cell dimensions are substantially unchanged over all concentrations of PVP in PPD-T. The unit cell dimensions of pure PPD-T, as found in PPD-T compositions including PVP, confirms that PPD-T and PVP are present in the compositions as independent materials in two phases.

As additional verification of the heterogeneous, two-phase, nature of the PPD-T/PVP composition of this invention, films of the composition at all concentrations of PVP are opaque; and transmission electron microscope inspection of samples of the composition at all concentrations of PVP reveal two separate phases of material.

Many of the qualities of the shaped articles of this invention are controlled or altered by the amount of PVP present in amounts from 5 to 50 weight percent based on weight of the PPD-T combination. The lower limit is a limit of practicality because, although the benefits of the invention will be present at any concentration of PVP, the benefits are difficult to measure at concentrations of less than about 10 weight percent.

The upper limit represents the concentration at which some qualities of the shaped-article begin to deteriorate due to the presence of excess PVP. It should be recognized that PVP is not known to be an outstanding or even impressive shaped-article forming material; and that, even though its presence in shaped-articles in combination with PPD-T yields shaped-articles of excellent and entirely unexpected improvements, there is a concentration for the PVP above which some qualities of the shaped articles are not acceptable. It is believed that above about 50 weight percent of PVP, based on the PPD-T combination, PVP is irreversibly leached from the shaped-article into the coagulation bath during manufacture.

The solvent system of this invention utilizes N-methyl-2-pyrrolidone (NMP) as a solvent liquid and requires PVP to be dissolved therein. As stated, the PVP is dissolved in the NMP in an amount which will yield a final polymer product having from 5 to 50, weight, percent PVP, based on the PPD-T combination. As a general rule, the PVP can be dissolved in the NMP at all concentrations; but, at very high concentrations of PVP, the viscosity becomes unmanageable.

It is optional but preferred that the solvent system should include a salt which serves as an aid to maintaining the polymer in solution. The salt is generally an alkaline earth halide; and is usually calcium chloride. PVP does not readily dissolve in a solution of the calcium chloride in NMP. The solvent system is conveniently made by, first, preparing a solution of the PVP in NMP and, then, adding the salt to that solution. While the order of addition of the PVP may be important to assure that the PVP remains dissolved in the system, the PVP can, also, be added after addition to the system of one of the reactive polymerization species.

To make the PPD-T combination, the PPD is generally added to the solvent system and, after agitation to assure complete dissolution, the TCl is placed in reactive contact with the PPD by adding it to the solvent system. The agitation is continued for a time to substantially complete the polymerization reaction to yield PPD-T in solution. The reactive polymerization species are added to the solvent system in amounts which will result in a PPD-T concentration, at the end of the polymerization reaction, of 4 to 15, weight, percent PPD-T based on total weight of the polymerization system. The PPD-T which is made by the process of this invention can have an inherent viscosity from 1 to 7, and preferably has an inherent viscosity above 2. PPD-T of high inherent viscosity can be made only if all components of the polymerization reaction system are scrupulously dry during polymerization of the PPD-T.

In order to make a PPD-T solution appropriate for use in making the shaped articles of this invention, a basic neutralizing material is added to the polymerization system to neutralize the acid which was generated during the polymerization reaction. The neutralizing material is generally an alkaline earth metal base, for example, oxide, hydroxide, carbonate, or hydride, and is preferably calcium oxide.

The solution of this invention is anisotropic and sulfuric acid-free. The solution can be used for casting films or making pulp, molding articles, spinning fibers, and the like. An effective solution should generally include 6 to 16 grams of polymer per 100 grams of solution. To experience the benefit of this invention, the polymer in the solution should be greater than about 10 weight percent and less than about 50 weight percent PVP, based on the weight of the PPD-T combination. The fibers of this invention are considered to be made from the combination of PVP and PPD-T; and the usual additives such as dyes, fillers, delusterants, UV stabilizers, antioxidants, flame retardants, and the like can be incorporated into the combination of PVP and PPD-T which constitutes the fibers. Fibers can be spun in accordance with well-known spinning procedures, such as those taught in U.S. Pat. No. 3,767,756 issued Oct. 23, 1973 on the application of Blades—incorporated herein by reference.

Solutions of this invention can be used, spun, extruded, cast, molded and the like at any temperature at which they are liquid or at any temperature at which the polymer remains in solution.

The resulting solution can, also, be used to make PPD-T composition fibrids. Fibrids are very small fiber-like particles which are made by combining the resulting solution, under vigorous forces of agitation, with a liquid which is miscible with the solvent of the resulting solution but which does not dissolve the PPD-T composition. Water is often used as the liquid in fibrid making processes.

TEST METHODS

Inherent Viscosity.

Inherent Viscosity (IV) is defined by the equation:

$$IV = ln(h_{rel})/c$$

where c is the concentration (0.5 gram of polymer in 100 ml of solvent) of the PPD-T in the polymer solution and hrel(relative viscosity) is the ratio between the flow times of the polymer solution and the solvent as measured at 30° C. in a capillary viscometer. The inherent viscosity values reported and specified herein are determined using concentrated sulfuric acid (96% $H_2SO_4$).

Tensile Properties. Yarns tested for tensile properties are, first, conditioned and, then, twisted to a twist multiplier of 1.1. The twist multiplier (TM) of a yarn is defined as:

TM=(twists/inch)/(5315/denier of yarn)$^{-\frac{1}{2}}$

The yarns to be tested are conditioned at 25° C., 55% relative humidity for a minimum of 14 hours and the tensile tests are conducted at those conditions. Tenacity (breaking tenacity), elongation (breaking elongation), and modulus are determined by breaking test yarns on an Instron tester (Instron Engineering Corp., Canton, Mass.).

Tenacity, elongation, and initial modulus, as defined in ASTM D2101-1985, are determined using yarn gage lengths of 25.4 cm and an elongation rate of 50%/strain/minute. The modulus is calculated from the slope of the stress-strain curve at 1% strain and is equal to the stress in grams at 1% strain (absolute) times 100, divided by the test yarn denier.

DESCRIPTION OF THE PREFERRED EMBODIMENTS

In the Examples which follow, all parts are by weight unless specifically stated to be otherwise.

EXAMPLE 1

In this example, a PPD-T composition was made in accordance with this invention.

In a reaction vessel, a solvent system was established by dissolving 12.5 parts calcium chloride in 147.5 parts NMP—both carefully and completely dried. 9.329 parts p-phenylene diamine were dissolved in the solvent system with agitation. 25 parts of a solution of 5 parts of PVP (molecular weight, 40,000) in 20 parts of NMP were added to the stirring system.

The stirring system was cooled to 5° C. degrees in an ice water bath; and, while maintaining the agitation and the ice water bath, 6.145 parts of terephthaloyl chloride were added to the polymerization system. After stirring for about 5 minutes, the vessel was removed from the ice water bath and 11.413 parts of terephthaloyl chloride were added to the stirring polymerization system. The system was stirred for an additional 5 minutes; and 4.83 parts calcium oxide, slurried in 50 parts NMP, were added to neutralize HCl generated during the polymerization reaction.

The neutralized system was stirred for an additional 60 minutes to substantially complete the polymerization reaction. The resulting product included a PPD-T composition made up of PPD-T and PVP which, when isolated, exhibited an inherent viscosity of 3.2. The inherent viscosity of the combination is, of course, much different from the inherent viscosity of either one of the PPD-T or PVP, alone. The resulting polymerization system was an anisotropic solution of para-aramid composition of 9.57% concentration; and, viewed in terms of PPD-T, only, had a concentration of 8%.

A film was cast on a glass plate from a portion of the anisotropic solution using a doctor knife with a 0.25 mm opening. The glass plate was placed in a vacuum oven set at 130° C. overnight to evaporate the solvent from the film. A highly opaque film was formed on the glass plate. The glass plate, with the film, was placed in room temperature water to extract residual solvent as well as calcium chloride from the film. The film was dried in a convection oven set at 120° C. The resulting film was highly opaque and was very strong in the direction of casting. The film was weak transverse to the direction of casting, thus, indicating the anisotropic nature of the solution and the resulting film product.

Fibrids were prepared from a portion of the anisotropic solution by introducing the solution, under vigorous forces of agitation, into a bath of water to cause precipitation of the poly(p-phenylene terephthalamide) into fibrid form.

Fibers were spun from a portion of the anisotropic solution by extruding the solution directly into water at a temperature of about 18° C. The fibers were washed and dried and exhibited a tenacity of 3.7 grams per denier, an elongation to break of 4.9%, and an initial modulus of 236 grams per denier.

EXAMPLE 2

Example 1 was repeated except that the solvent system was made up of 23.4 parts calcium chloride in 276.6 parts NMP and 55 parts of that solution were used in the polymerization reaction. All other aspects of this Example were the same as in Example 1.

The PPD-T composition, when isolated, exhibited an inherent viscosity of 5.86 and the resulting polymerization system was an anisotropic solution of para-aramid composition of 7.54 % concentration; and viewed in terms of PPD-T, only, had a concentration of 5.38%.

COMPARISON EXAMPLE 1

In this Example, [poly(2,2-Bis[4-(4-aminophenoxy)-phenylpropane terephthalamide)] (BAPP-T) polymer was prepared in the presence of PVP. BAPP-T is an aromatic polyamide copolymer and, in combination with PVP, yields a completely homogeneous solution of the components and does not yield an anisotropic polymerization solution. Moreover, shaped articles of this BAPP-T/PVP combination are clear and evidence the miscibility and homogeneity of the components as compared with the heterogeneity of PPD-T/PVP composition of the present invention.

In a reaction vessel, a solvent system was established by dissolving 9.0 parts of PVP (molecular weight 40,000) in 221 parts of NMP—both carefully and completely dried. Into the solvent system was added 16.42 parts of BAPP 2,2-Bis[4-(4-aminophenoxy)phenyl-propane[BAPP], flake and the mixture was stirred until all of BAPP flake was completely dissolved. That solution was cooled to about 15° C. and 7.9 parts terephthalic acid dichloride were added to the mixture, with stirring. The temperature rose during the reaction and the mixture was then heated, additionally, to 50° C. While continuing the stirring, 0.21 part of terephthalic acid dichloride was added to complete the polymerization. Finally, 0.2 part benzoyl chloride was added to react any remaining amino end groups; and, after one-half hour, 2.25 parts calcium oxide were added to neutralize hydrogen chloride generated during the course of the polymerization. The resulting solution was light yellow in color but transparent which was indication of the isotropic nature of the solution. The calculated resulting polymer composition was 70%, by weight, BAPP-T and 30%, by weight, PVP.

A film was cast on a glass plate from a portion of the polymerization solution using a doctor knife with a 0.25 mm opening. The glass plate was placed in a vacuum oven set at 130° C. overnight to evaporate the solvent from the film. Transparent film was formed on the glass plate. The glass plate, with the film, was placed in room temperature water to extract residual solvent as well as calcium chloride from the film. The film was dried in a convection oven set at 120° C.

The film was crystal clear indicating homogeneous blend of BAPP-T and PVP.

COMPARISON EXAMPLE 2

In this example, fully polymerized BAPP-T and fully polymerized PVP were combined to yield solutions of the materials and films were cast from these solutions. To make BAPP-T, the same procedure as in Comparison Example 1 was used except that PVP was not added to the system. The resulting BAPP-T polymer solution was clear but slightly yellow in color. The BAPP-T was isolated by pouring the polymerization solution into vigorously agitated water, washing several times in water, and then drying in a vacuum at 120° C.

Various concentrations of BAPP-T/PVP blend solutions were prepared by adding dried BAPP-T polymer flake prepared above and PVP(40,000 in MW) powder to 25 parts of NMP in small glass bottles. The contents were shaken at room temperature until all solids are completely dissolved. Films were made from these solutions according to the procedures in Comparison Example 1. The results are described in the following table:

TABLE

| Run Number | BAPP-T Wt. Parts | PVP Wt. Parts | % BAPP-T | % PVP | Solution Clarity | Film Clarity |
|---|---|---|---|---|---|---|
| 2-1 | 1.50 | 0.0 | 100 | 0 | Clear | Clear |
| 2-2 | 1.50 | 0.5 | 75 | 25 | Clear | Clear |
| 2-3 | 1.50 | 1.0 | 60 | 40 | Clear | Clear |
| 2-4 | 1.50 | 1.5 | 50 | 50 | Clear | Clear |
| 2-5 | 1.50 | 3.0 | 33 | 67 | Clear | Clear |
| 2-6 | 1.50 | 4.5 | 25 | 75 | Clear | Clear |
| 2-7 | 0.00 | 5.0 | 0 | 100 | Clear | Clear |

The films were also examined by transmission electron microscopy and no indication of multiple phases was found for any of the compositions.

I claim:
1. A process for making an anisotropic poly(p-phenylene terephthalamide) composition of a heterogeneous but intimate combination of poly(p-phenylene terephthalamide) and polyvinyl pyrrolidone by polymerizing poly(p-phenylene terephthalamide) in the presence of polyvinyl pyrrolidone, including the steps of:
   a) establishing a solvent system including polyvinyl pyrrolidone, N-methyl pyrrolidone, and alkaline earth metal salt;
   b) placing, in reactive contact in the solvent system, p-phenylene diamine and terephthaloyl chloride to yield a polymerization system;
   c) agitating the polymerization system to yield an anisotropic poly(p-phenylene terephthalamide) composition in solution.
2. The process of claim 1 wherein the polyvinyl pyrrolidone is present in an amount of from 5–50 weight percent of the poly(p-phenylene terephthalamide) composition.
3. The process of claim 1 wherein the solvent system is established by dissolving the polyvinyl pyrrolidone in the N-methyl pyrrolidone prior to dissolving the alkaline metal earth salt therein.
4. The process of claim 1 wherein the pophenylene diamine and the terephthaloyl chloride are added in amounts which will yield a poly(p-phenylene terephthalamide) composition which is 4 to 15 weight percent based on the total weight of the polymerization system.

* * * * *

UNITED STATES PATENT AND TRADEMARK OFFICE
CERTIFICATE OF CORRECTION

PATENT NO. : 5,416,164
DATED : MAY 16, 1995
INVENTOR(S) : KIU-SEUNG LEE

It is certified that error appears in the above-identified patent and that said Letters Patent is hereby corrected as shown below:

COLUMN 8, LINE 41, CLAIM 4, CHANGE "POPHENYLENE" TO
-- P-PHENYLENE --.

Signed and Sealed this

First Day of August, 1995

Attest:

BRUCE LEHMAN

Attesting Officer        Commissioner of Patents and Trademarks